United States Patent
Lin

(10) Patent No.: US 8,371,776 B2
(45) Date of Patent: Feb. 12, 2013

(54) DAMPER FOR A CUTTING TOOL

(75) Inventor: Kuo-Chi Lin, Taichung (TW)

(73) Assignee: Ying-Fan Enterprise Co., Ltd., Taichung (TW)

( * ) Notice: Subject to any disclaimer, the term of this patent is extended or adjusted under 35 U.S.C. 154(b) by 691 days.

(21) Appl. No.: 12/620,568

(22) Filed: Nov. 17, 2009

(65) Prior Publication Data

US 2011/0116883 A1    May 19, 2011

(51) Int. Cl.
 *B23B 29/02*    (2006.01)
(52) U.S. Cl. .......................... 408/143; 82/158
(58) Field of Classification Search .......... 82/158, 82/904; 407/66; 408/143
See application file for complete search history.

(56) References Cited

U.S. PATENT DOCUMENTS

| | | | | |
|---|---|---|---|---|
| 4,061,438 A | * | 12/1977 | New | 408/143 |
| 5,700,116 A | * | 12/1997 | Cobb, Jr. | 409/141 |
| 6,619,165 B2 | * | 9/2003 | Perkowski | 82/160 |
| 7,028,997 B2 | * | 4/2006 | Takahashi et al. | 267/137 |
| 2006/0275090 A1 | * | 12/2006 | Onozuka et al. | 408/143 |
| 2007/0089574 A1 | * | 4/2007 | Murakami et al. | 82/158 |
| 2010/0242696 A1 | * | 9/2010 | Digernes et al. | 83/169 |

FOREIGN PATENT DOCUMENTS

| | | | | |
|---|---|---|---|---|
| JP | 2003136301 A | * | 5/2003 | |
| JP | 2005199391 A | * | 7/2005 | |
| JP | 2005279819 A | * | 10/2005 | |
| SU | 1196153 A | * | 12/1985 | |

* cited by examiner

*Primary Examiner* — Daniel Howell
*Assistant Examiner* — Paul M Janeski

(57) ABSTRACT

A cutting tool includes a blade, a seat, a shank and a damper. The blade is connected to the seat. The seat is connected to the shank. The shank includes a pocket defined therein and a thread formed on the wall of the pocket. A damper is inserted in the pocket. The damper includes a thread formed on the periphery for engagement with the thread of the shank, with a small gap defined between the threads.

7 Claims, 11 Drawing Sheets

DAMPER FOR A CUTTING TOOL

BACKGROUND OF THE INVENTION

The present invention relates to a cutting tool and, more particularly, to a damper for a cutting tool.

During an operation of cutting a work piece with a cutting tool, vibration inevitably occurs and affects the precision of the operation. It is therefore a practice to reduce the vibration by inserting a damper within a shank of the cutting tool.

Dampers have been disclosed in documents such as Japanese Patent Application Publication Nos. 2001-96403, 2003-62703, 2003-136301, 2005-177973, 1994-31505 and 1994-31507 and Japanese Patent Publication No. 2979823.

Japanese Patent Application Publication No. 2003-136301 discloses a cutting tool including a blade attached to a front end of a shank. A deep hole is defined in the shank. The deep hole includes an open end at a rear end of the shank and a closed end near the front end of the deep hole. A damper is inserted in the deep hole, adjacent to the blade. A super hard core is inserted in the deep hole, behind the camper.

Japanese Patent Application Publication No. 1994-31507 discloses a cutting tool including a shank. Viscous fluid and a balancing block are introduced into a deep hole defined in the shank.

Japanese Patent Publication No. 2979823 discloses a helical spring inserted in a deep hole defined in a shank of a cutting tool and a viscous elastic material provided between the helical spring and a closed end of the deep hole. A blade is attached to the helical spring. A frictional, vibration-absorbing material is provided between the blade and the shank for transforming vibration into heat that can be dissipated, thus reducing the vibration.

In each of the foregoing references, it is difficult to make the deep hole in the shank where the external diameter of the shank is small. It requires a deep-hole drill to make the deep hole in the shank, and this is expensive. Moreover, the deep hole compromises the strength of the shank. Moreover, the structure is complicated and entails a high cost.

Japanese Patent Application Publication No. 1994-31505 discloses a shank including a bore defined therein for receiving a damper made of a different material. Friction between the shank and the damper reduces the vibration.

Japanese Patent Application Publication Nos. 2001-96403 and 2003-62703 both disclose a damping material introduced into a bore defined in a shank of a cutting tool. The damping material absorbs the energy of the vibration, thus reducing the vibration. In addition to the foregoing problems, these references involve the use of the damping material including Mn—Cu alloys that are often expensive and cannot be fabricated easily. Therefore, it is difficult to reach a high performance at a low cost according to these references.

Japanese Patent Application Publication No. 2005-177973 is intended to provide a cutting tool with excellent damping at a low cost by making a polygonal pocket in a shank of a cutting tool, inserting a damper in the pocket and closing the pocket with a cover, thus keeping the damper in the pocket. The damper can be strip-like, cylindrical or polygonal. The damper is not connected to the shank, with a gap between them. During an operation of cutting a work piece with the cutting tool, the damper alternatively hits different portions of the wall of the pocket because of inertia, thus reducing vibration. The effect of the reduction of the vibration depends upon the gap. The effect of the reduction of the vibration is poor if the gap is too small or too big. It is however difficult to keep the gap within an appropriate range.

Thus, there is a need for an inexpensive and effective damper for a cutting tool.

BRIEF SUMMARY OF THE INVENTION

The present invention satisfies this need and solves other problems in the field of cutting tools by providing, in a preferred form, a cutting tool with a blade, a seat, a shank and a damper. The blade is connected to the seat. The seat is connected to the shank. The shank includes a pocket defined therein and a thread formed on the wall of the pocket. A damper is inserted in the pocket. The damper includes a thread formed on the periphery for engagement with the thread of the shank, with a small gap defined between the threads.

The present invention will become clearer in light of the following detailed description of illustrative embodiments of this invention described in connection with the drawings.

DESCRIPTION OF THE DRAWINGS

The present invention will be described in relation to embodiments with reference to the accompanying drawings where.

Figure 1:
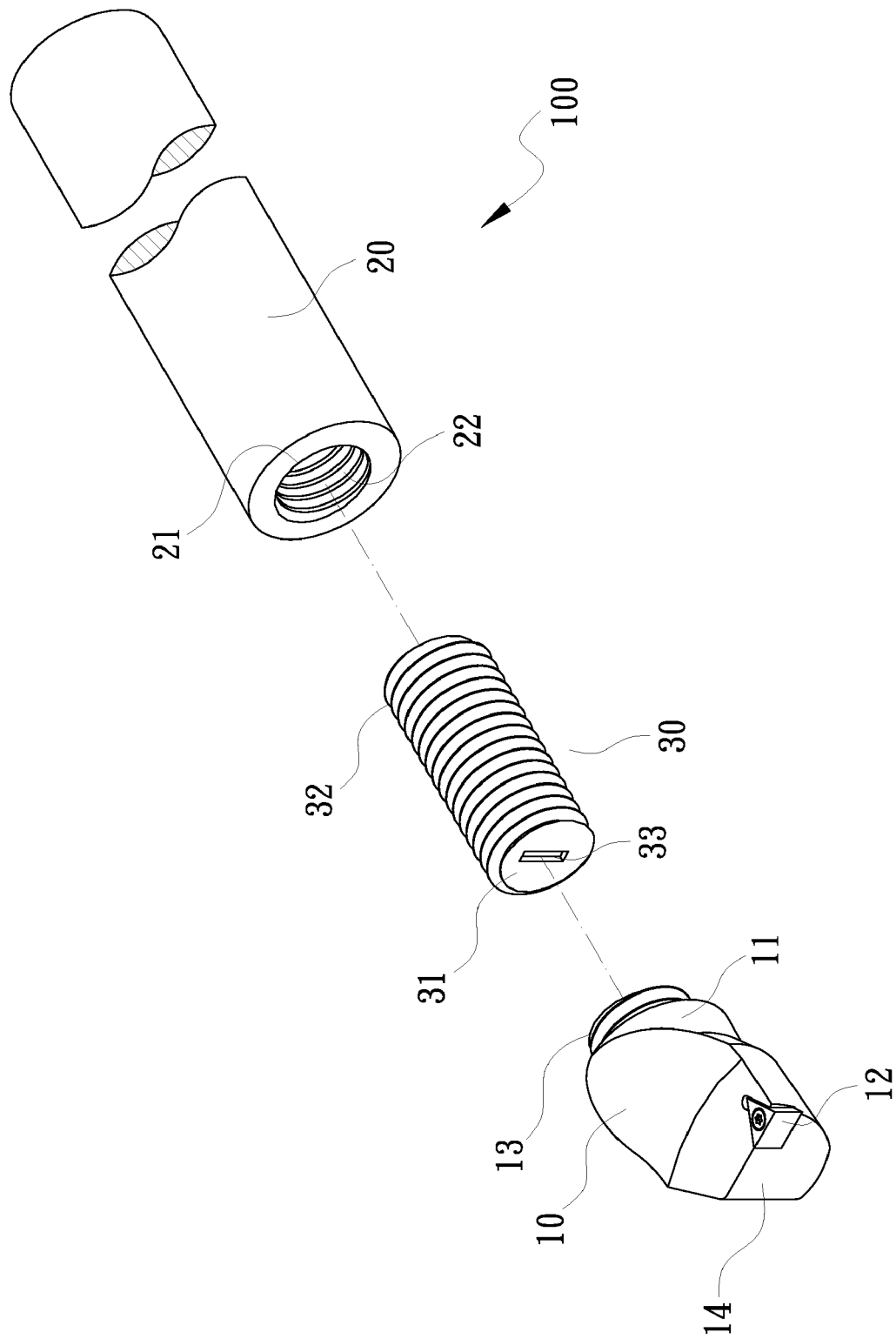
FIG. 1 is an exploded view of a cutting tool according to a first embodiment of the present invention.
Figure 2:
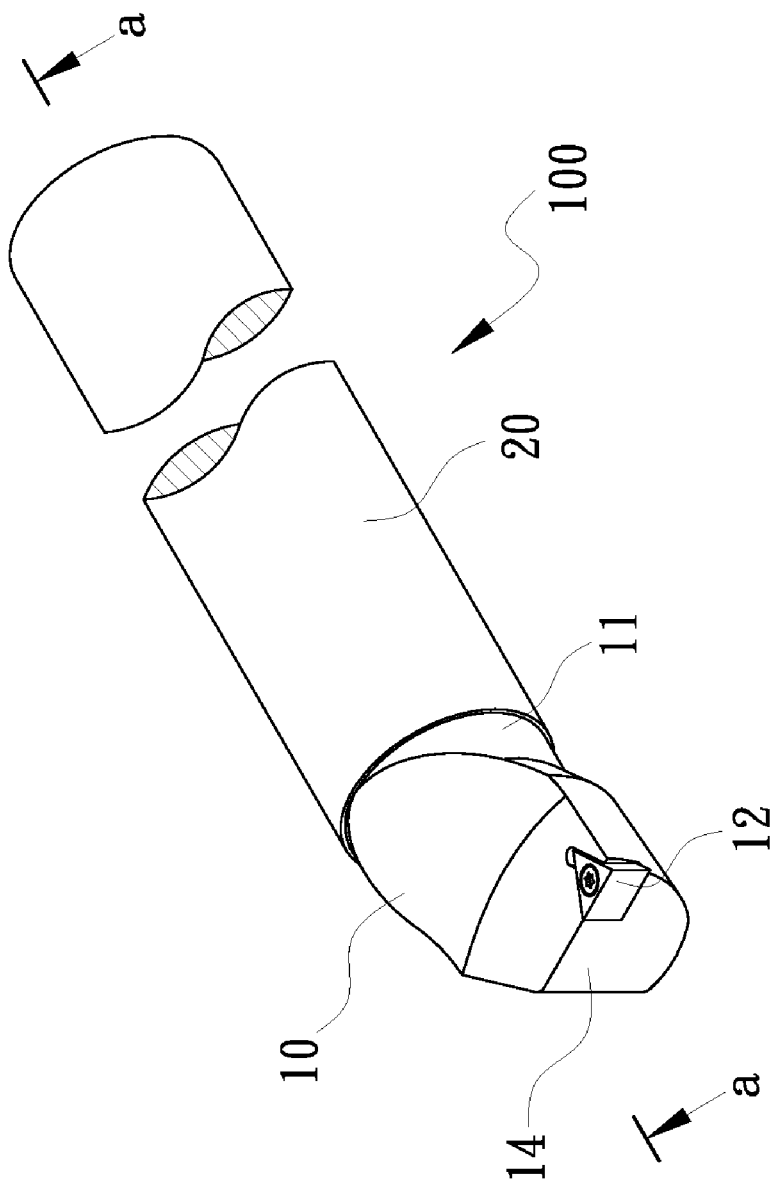
FIG. 2 is a perspective view of the cutting tool shown in FIG. 1.
Figure 3:
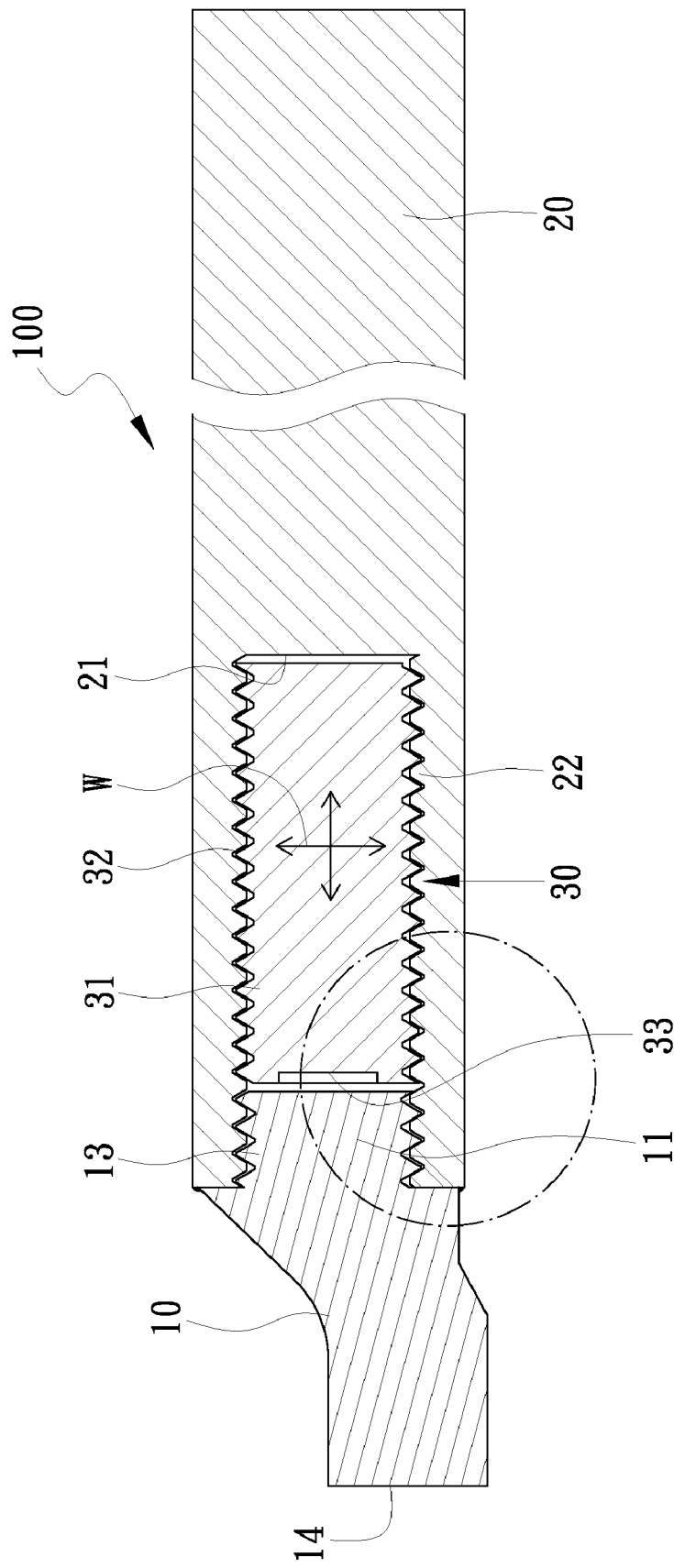
FIG. 3 is a cross-sectional view of the cutting tool shown in FIG. 2.
Figure 4:
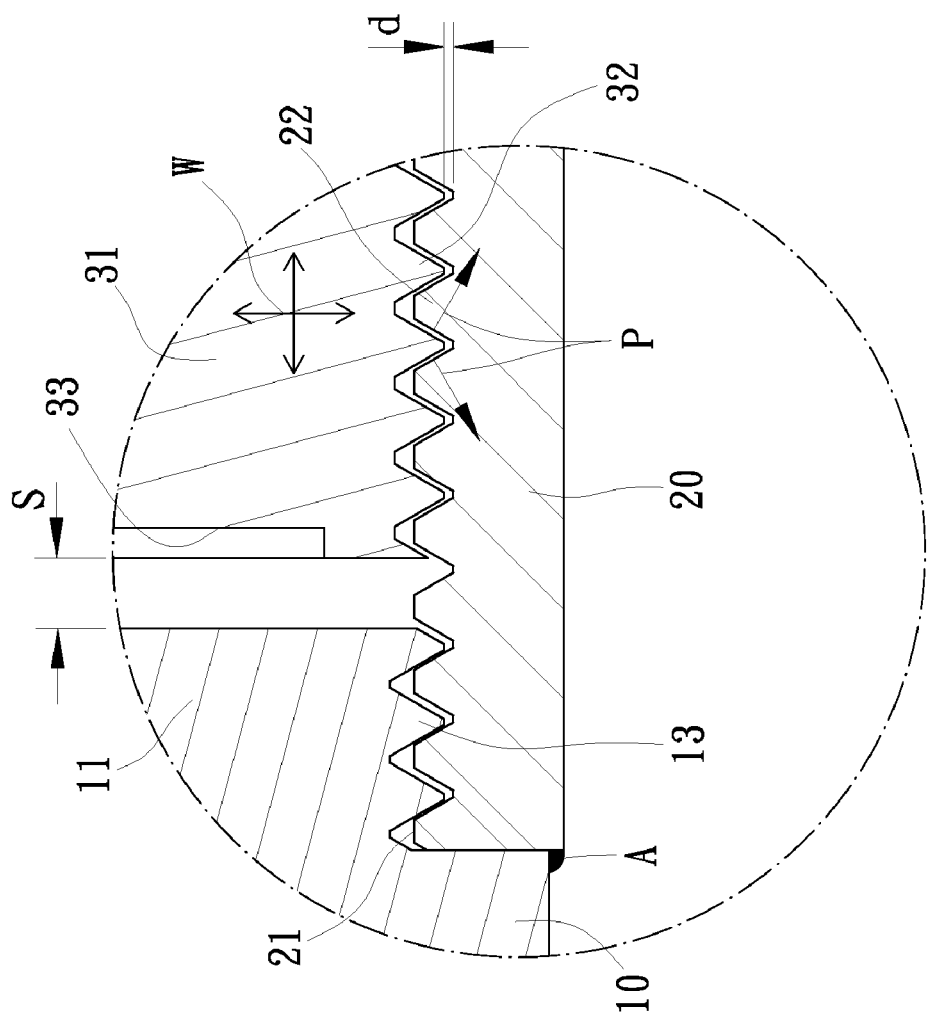
FIG. 4 is a partial, enlarged view of the cutting tool shown in FIG. 3.

All figures are drawn for ease of explanation of the basic teachings of the present invention only. The extensions of the figures with respect to number, position, relationship, and dimensions of the parts to form the preferred embodiments will be explained or will be within the skill of the art after the following teachings of the present invention have been read and understood. Moreover, the exact dimensions and dimensional proportions to conform to specific force, weight, strength, and similar requirements will likewise be within the skill of the art after the following teachings of the present invention have been read and understood.

Where used in the drawings, the same numerals designate the same or similar parts. Furthermore, when the terms "first", "second", "lower", "upper", "inner", "outer", "side", "end", "portion", "section", "longitudinal", "axial", "radial", "circumferential", "centrifugal", "lateral", "horizontal", "vertical", "annular", "outward", "inward", "spacing", "clockwise", "counterclockwise", "length", "width", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Referring to FIGS. 1 to 4, a cutting tool 100 includes a blade unit, a shank 20 connected to blade unit and a damper 30 movably inserted in shank 20 according to a first embodiment of the present invention. The blade unit includes a blade 12 and a seat 10. Seat 10 includes a shank-connecting portion 11 formed at an end and a blade-connecting portion 14 formed at an opposite end. A thread 13 is formed on shank-connecting portion 11 of seat 10. Blade 12 is detachably connected to blade-connecting portion 14 of seat 10.

Shank 20 is a hollow element with a pocket 21 axially defined therein. A thread 22 is formed on the wall of pocket 21 corresponding to thread 13.

Damper 30 includes a rod 31, a thread 32 formed on the periphery of rod 31 corresponding to thread 22 and a groove 33 defined in an end of rod 31. Damper 30 is inserted in shank 20 by engaging thread 32 with thread 22. A flat tip of a screwdriver can be inserted in groove 33, and the screwdriver is therefore operable to rotate damper 30. The length of rod 31 is shorter than the depth of pocket 21 so that damper 30 can be inserted in shank 20 completely. Seat 10 is connected to shank 20 by engaging thread 13 with thread 22. As indicated with "A", welding is used to secure seat 10 to shank 20, thus retaining damper 30 within shank 20.

There is intended to be a gap S between an end of rod 31 and a closed end of pocket 21 and another gap S between an opposite end of rod 31 and shank-connecting portion 11 of seat 10. There is intended to be a gap D between the threads 22 and 32. The width of gap D is 0.01 to 0.5 mm. As indicated with arrow heads W, damper 30 is moved relative to shank 20 because of inertia when cutting tool 100 cuts a work piece, thus causing vibration. The forces exerted on damper 30 and shank 20 by each other can be dispersed as indicated with arrow heads P, i.e., in directions perpendicular to interfaces between thread 32 and 22. The vibration can effective be reduced since Gap D is small and the density of damper 30 is larger than that of shank 20.

Figure 5:
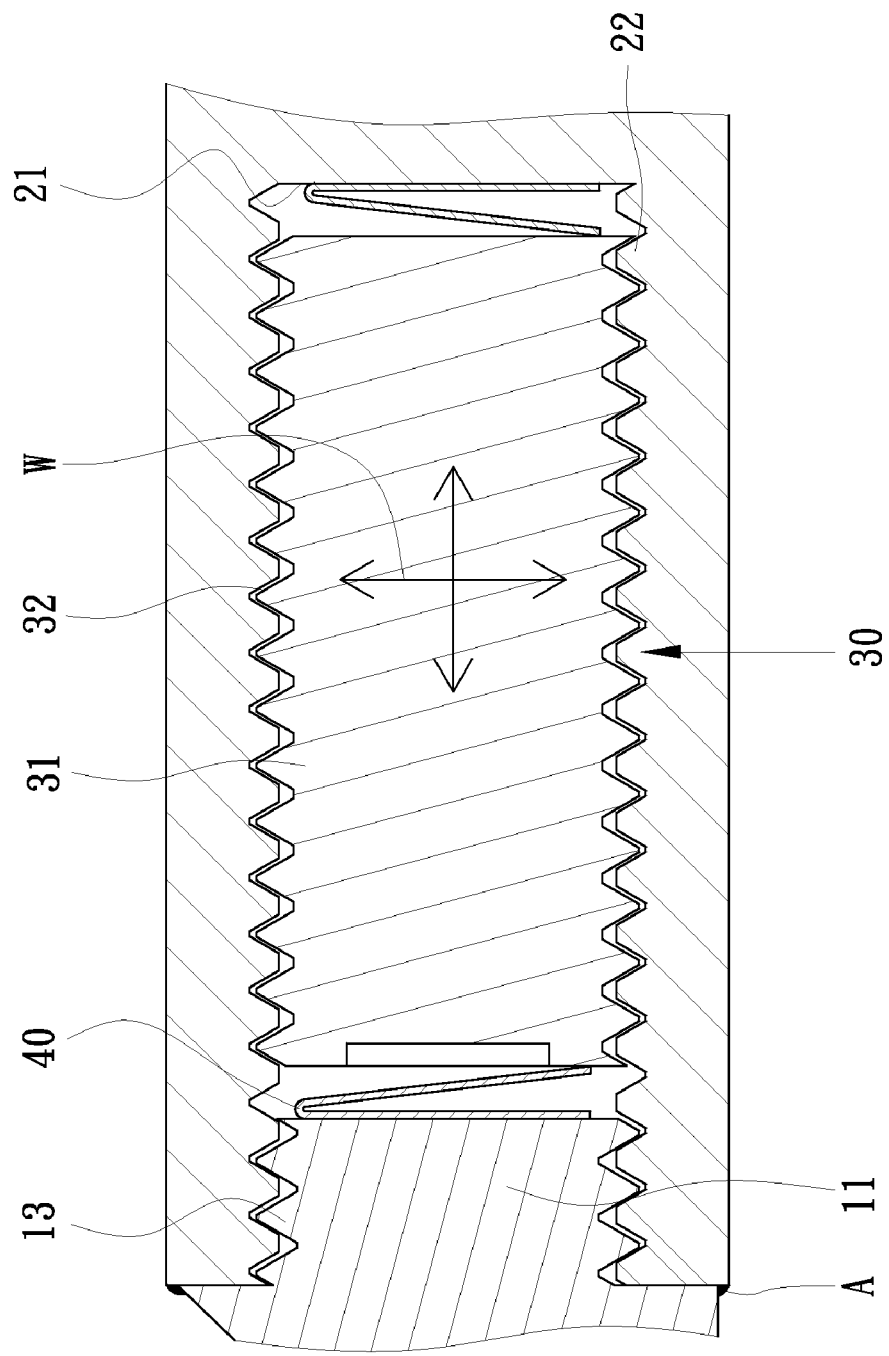
FIG. 5 is a cross-sectional view of a cutting tool according to a second embodiment of the present invention.

Referring to FIG. 5, there is shown a cutting tool 100 according to a second embodiment of the present invention. The second embodiment is identical to the first embodiment except two things. Firstly, an elastic element such as a leaf spring 40 is secured to the closed end of pocket 21 by welding and compressed between an end of rod 31 and a closed end of pocket 21. Secondly, another leaf spring 40 is secured to shank-connecting portion 11 of seat 10 by welding and compressed between an opposite end of rod 31 and shank-connecting portion 11 of seat 10. Leaf springs 40 are useful for restricting the movement of damper 30 within a small range centered at a middle point of pocket 21. Therefore, the proper operation of damper 30 within shank 20 is ensured.

Figure 6:
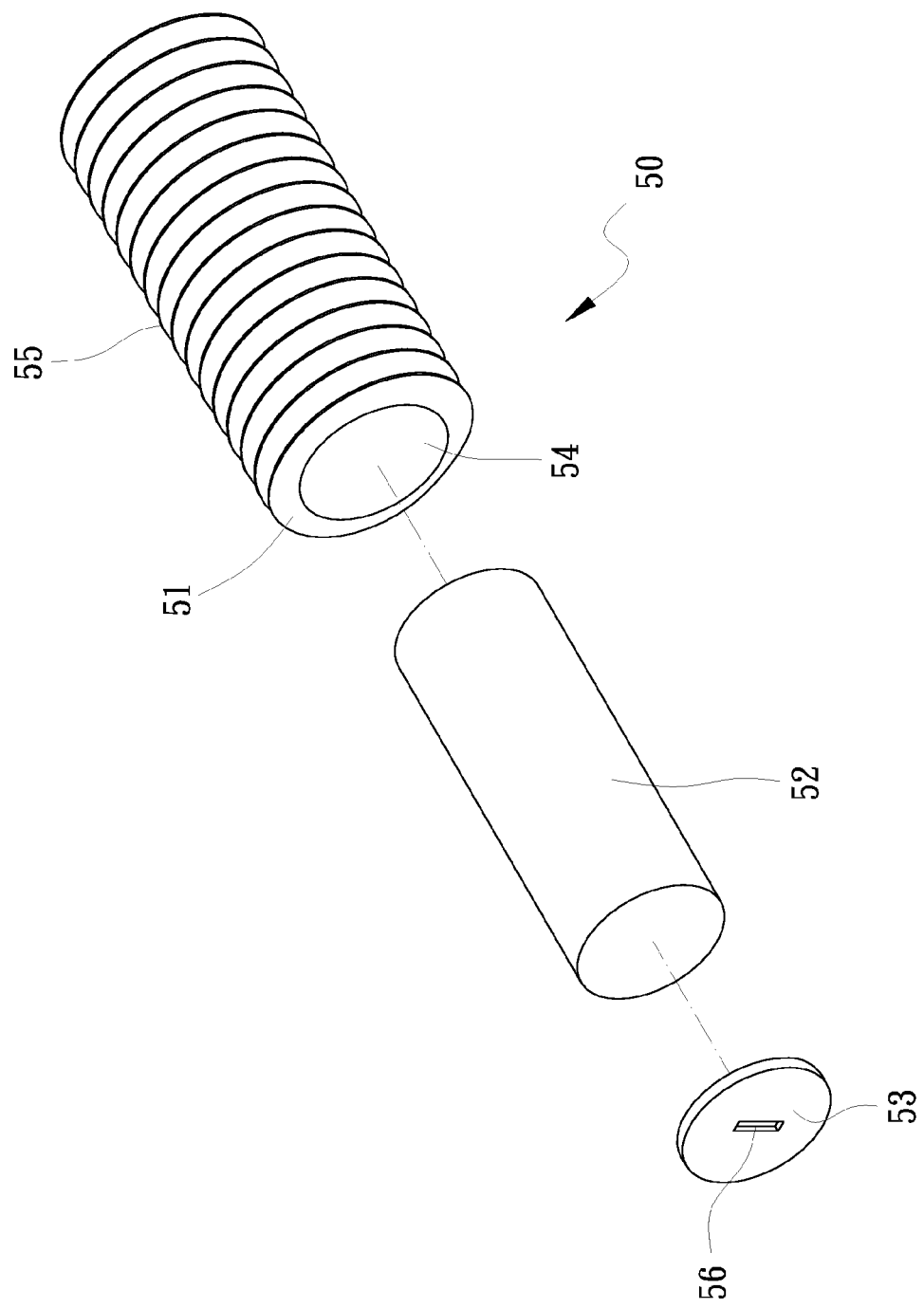
FIG. 6 is an exploded view of a damper according to a third embodiment of the present invention.
Figure 7:
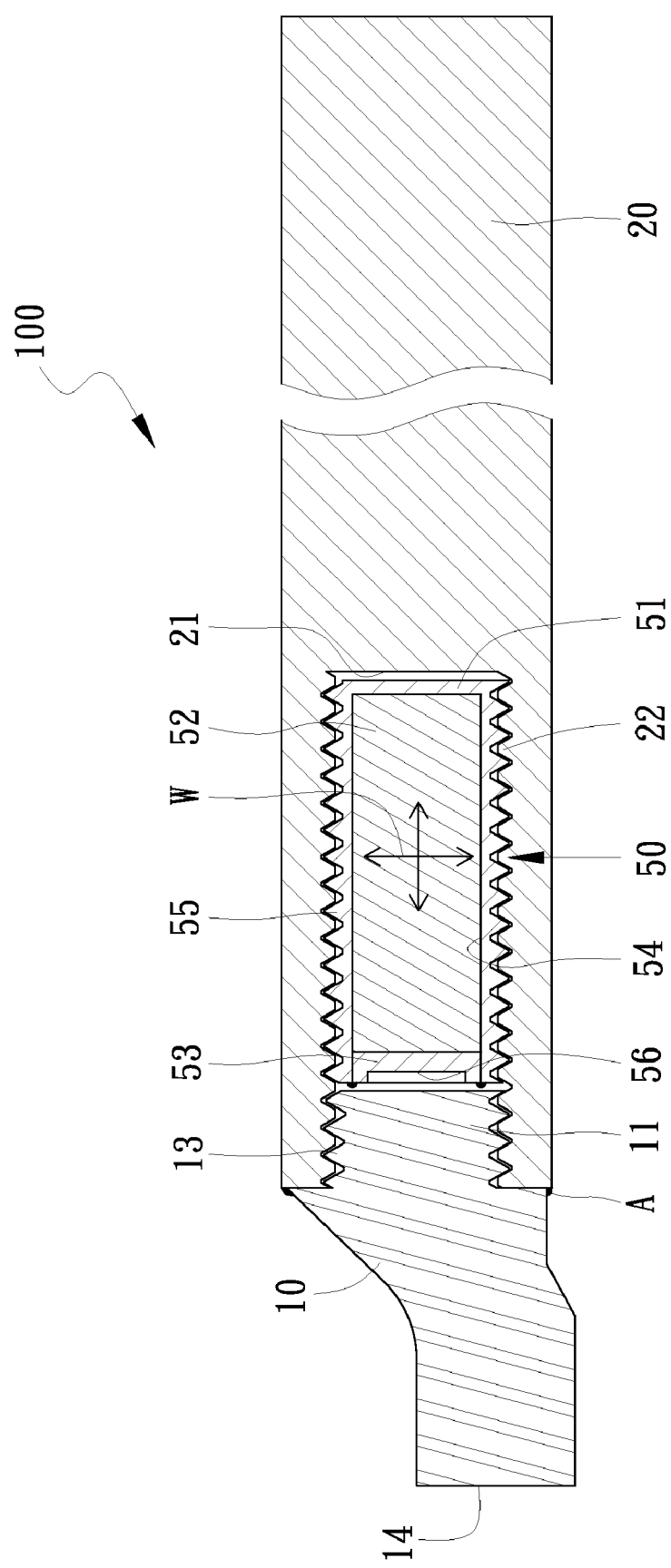
FIG. 7 is a cross-sectional view of a cutting tool including the damper shown in FIG. 6.

Referring to FIGS. 6 and 7, there is shown a damper 50 according to a third embodiment of the present invention. Damper 50 includes a shell 51, a core 52 inserted within shell 51 and a cover 53 secured to shell 51, thus retaining core 52 within shell 51. Shell 51 is in the form of a hollow cylinder, with a chamber 54 defined therein. A thread 55 is formed on an external side of shell 51. An internal side of shell 51 (or "the wall of chamber 54") is smooth.

Core 52 is in the form of a solid cylinder with a smooth periphery. The density of core 52 is larger than that of shell 51 or shank 20 within which damper 50 is inserted. Core 52 is fit in chamber 54.

Cover 53 includes a groove 56 defined in a side thereof. Cover 53 is preferably in the form of a plug fit in shell 51, with groove 56 exposed to the exterior of shell 51. Furthermore, welding is used to secure cover 53 to shell 51.

Damper 50 is inserted in shank 20 by engaging thread 55 with thread 22. A flat tip of a screwdriver can be inserted in groove 56, and the screwdriver is therefore operable to rotate damper 30. The third embodiment is like the first embodiment except using the three-piece configuration instead of the one-piece configuration.

Figure 8:
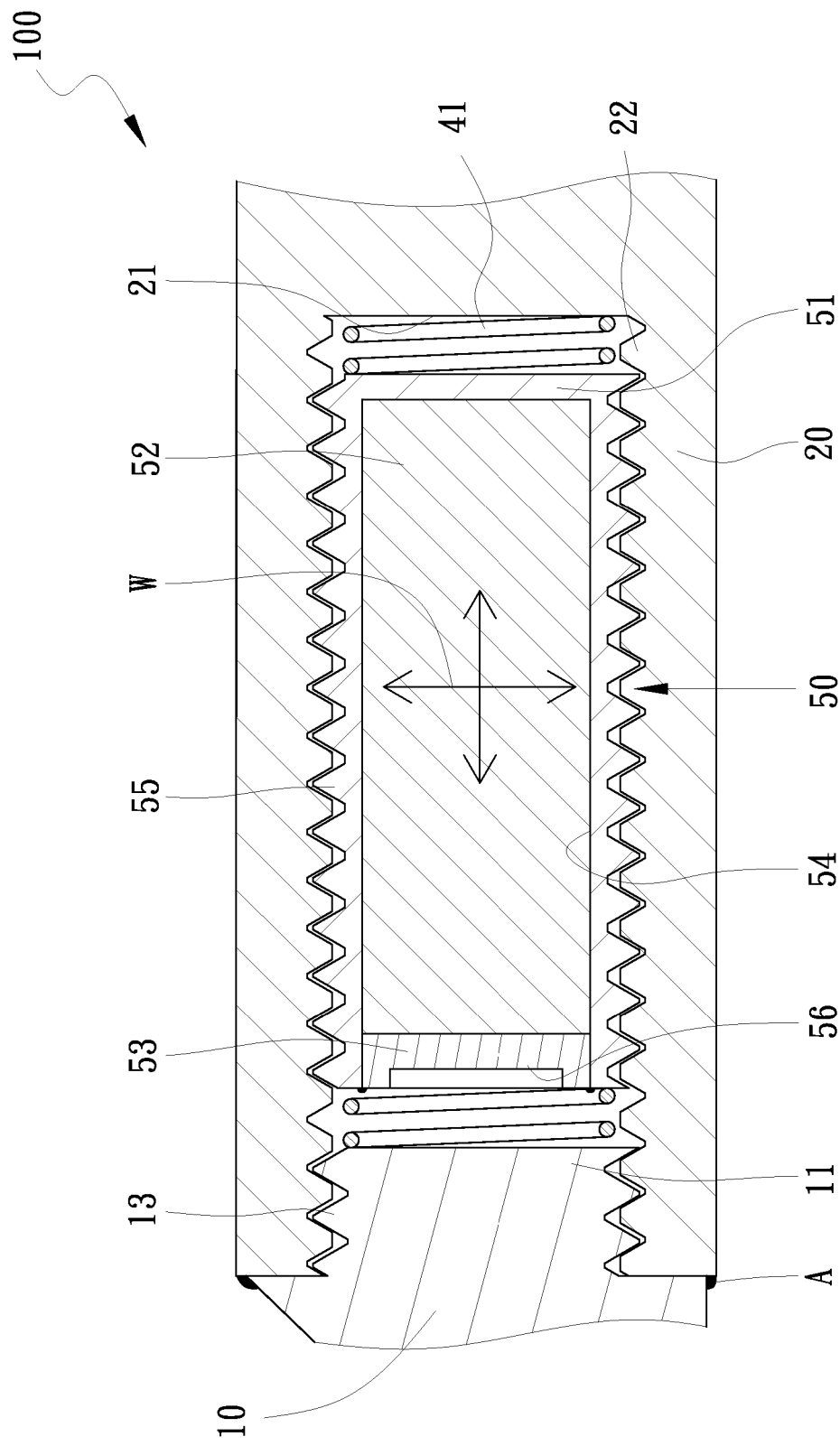
FIG. 8 is a cross-sectional view of a cutting tool according to a fourth embodiment of the present invention.

Referring to FIG. 8, there is shown a cutting tool 100 according to a fourth embodiment of the present invention. The fourth embodiment is identical to the third embodiment except two things. Firstly, an elastic element such as helical spring 41 is welded to the closed end of pocket 21 and compressed between an end of damper 50 and a closed end of pocket 21. Secondly, another helical spring 41 is welded to shank-connecting portion 11 of seat 10 and compressed between an opposite end of damper 50 and shank-connecting portion 11 of seat 10. Helical springs 41 are useful for restricting the movement of damper 50 within a small range centered at a middle point of pocket 21. Therefore, the proper operation of damper 50 within shank 20 is ensured.

Figure 9:
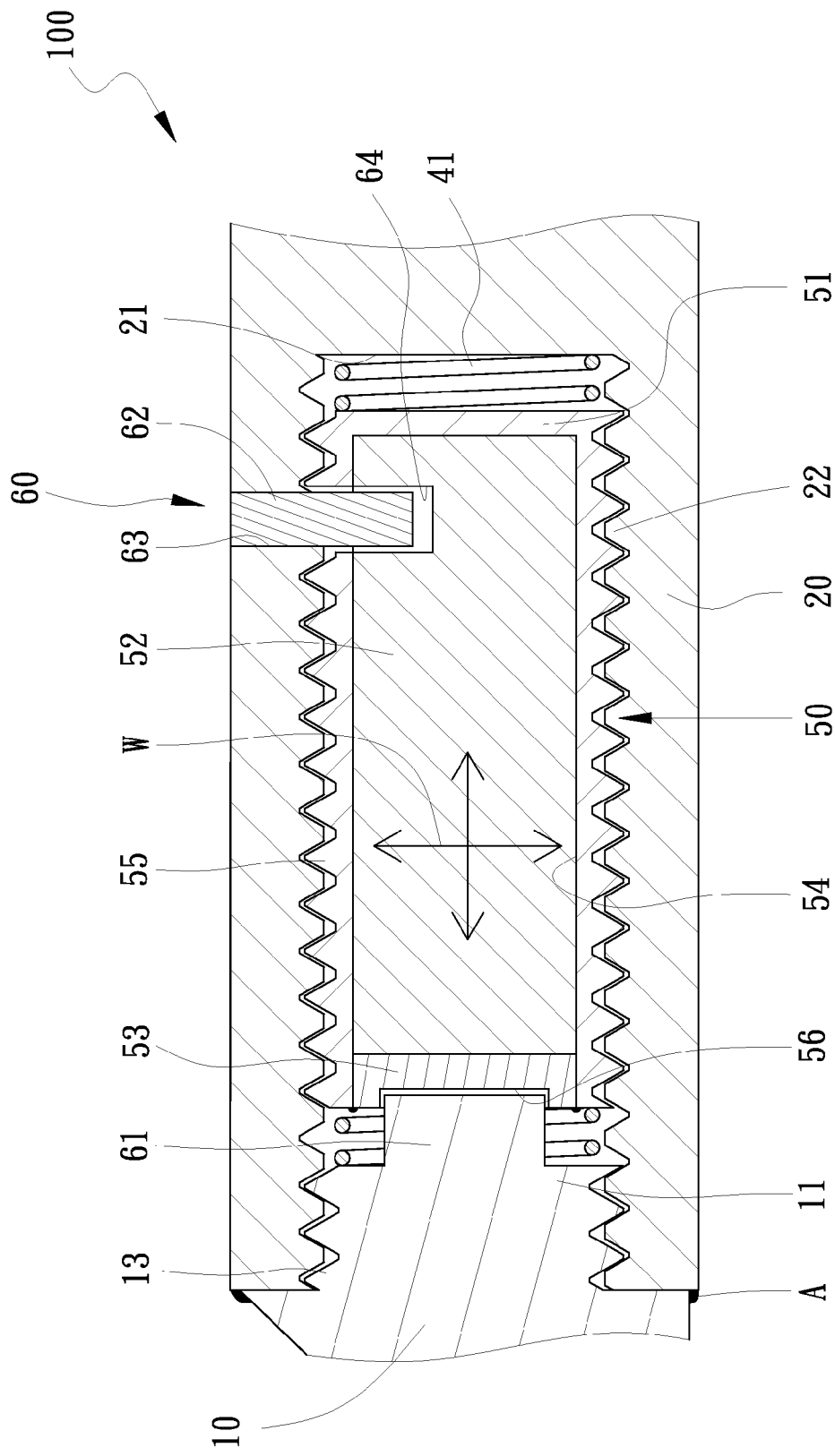
FIG. 9 is a cross-sectional view of a cutting tool according to a fifth embodiment of the present invention.

Referring to FIG. 9, there is shown a cutting tool 100 according to a fifth embodiment of the present invention. The fifth embodiment is like the fourth embodiment except including a restricting device 60 for restricting the movement and rotation of damper 50 within shank 20. Restricting device 60 includes a rib 61 and a pin 62. Rib 61 is formed at an end of shank-connecting portion 11 of seat 10. The size of rib 61 is smaller than that of groove 56, thus allowing rib 61 to be inserted in groove 56, thus restricting the rotation of damper 50 within shank 20 within a small range. Pin 62 is fit in a recess 64 defined in damper 50 through an aperture 63 defined in shank 20, thus restricting the rotation of damper 50 relative to shank 20 within a small range. Recess 64 can extend in shell 51 only, or extend to core 52, or extend throughout shell 51 and core 52.

It should be noted that damper 50 moves for a distance equal to the pitch of thread 55 while damper 50 and therefore pin 62 rotate for 360 degrees. As the rotation of pin 62 is restricted within a small angle such as 5 degrees, the movement of the pin 62 and therefore damper 50 is limited within a very small range centered at the middle point of pocket 21.

Figure 10:
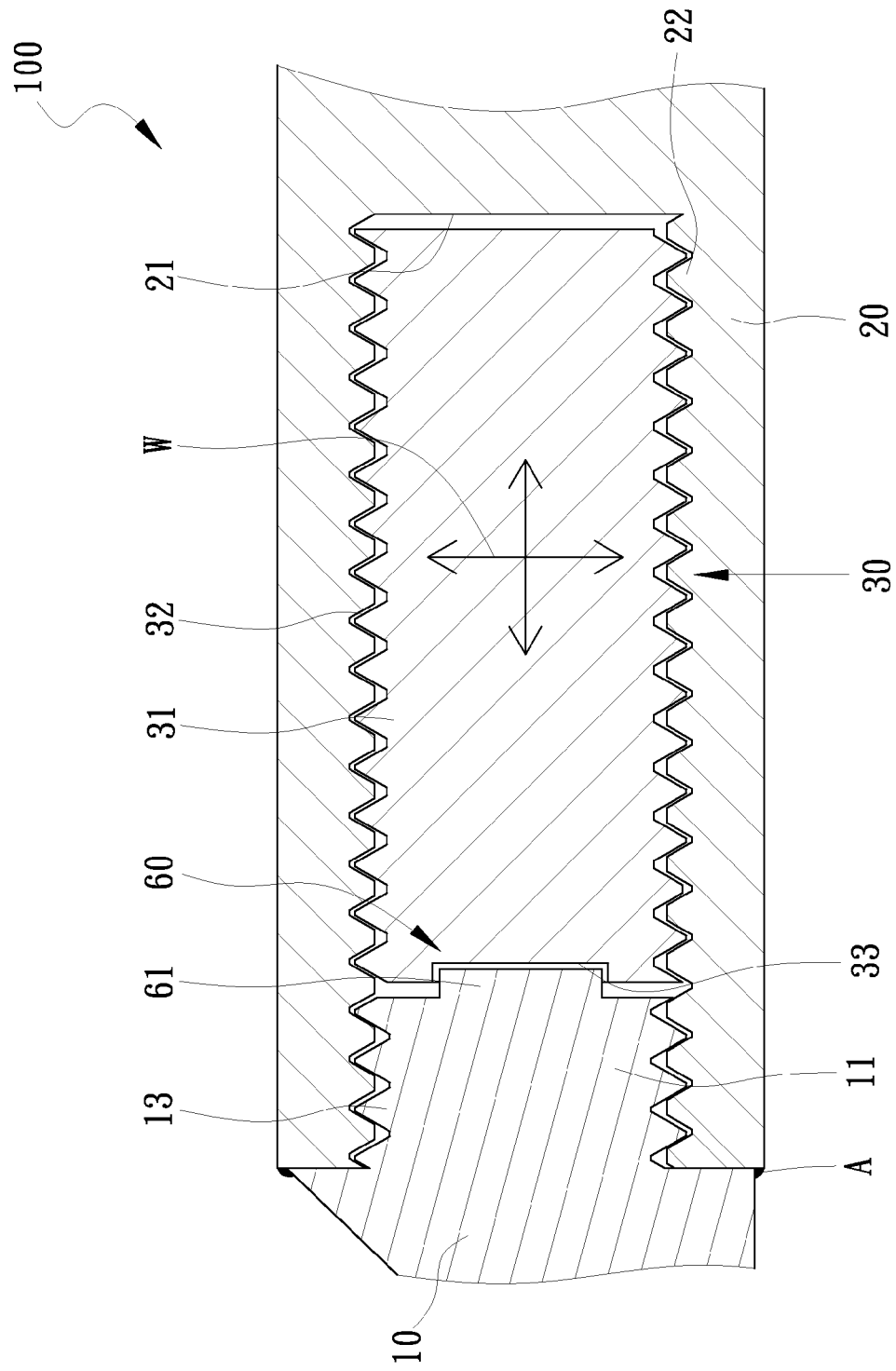
FIG. 10 is a cross-sectional view of a cutting tool according to a sixth embodiment of the present invention.

Referring to FIG. 10, there is shown a cutting tool 100 according to a sixth embodiment of the present invention. The sixth embodiment is like the first embodiment except including the rib 61 of the fifth embodiment.

Figure 11:
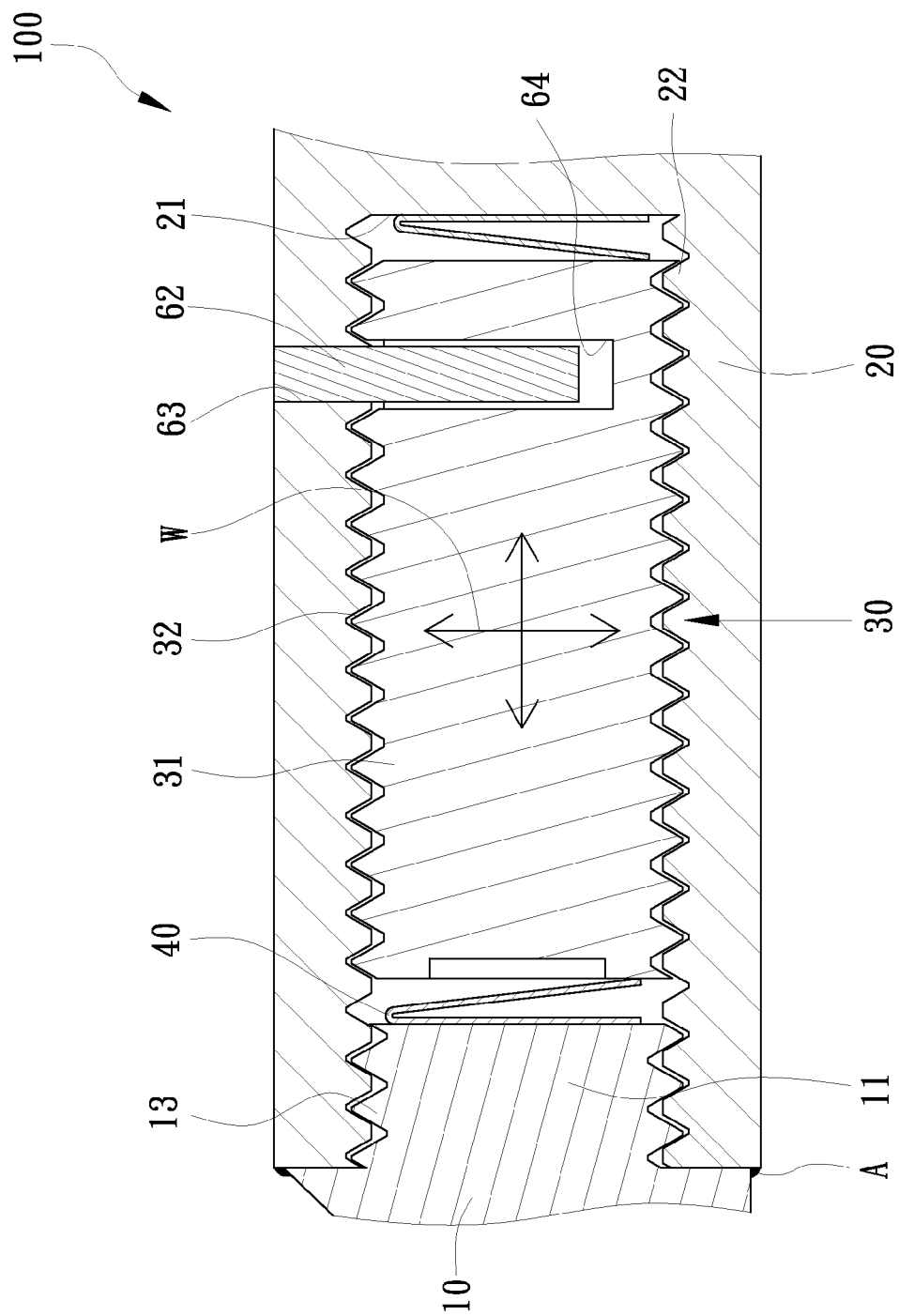
FIG. 11 is a cross-sectional view of a cutting tool according to a seventh embodiment of the present invention.

Referring to FIG. 11, there is shown a cutting tool according to a seventh embodiment of the present invention. The seventh embodiment is like the second embodiment except including the pin 62 of the fifth embodiment.

Since the invention disclosed herein may be embodied in other forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:
1. A cutting tool comprising, in combination:
   a blade for cutting a work piece;
   a seat for supporting the blade, wherein the seat includes a rib formed at an end;

a shank connected to the seat, wherein the shank comprises a pocket defined therein and a thread formed on the wall of the pocket; and a damper inserted in the pocket, wherein the damper comprises a thread formed on the periphery for engagement with the thread of the shank, with a small gap (D) defined between the threads, wherein the damper includes a groove for receiving the rib.

2. The cutting tool according to claim 1 further comprising at least one elastic element between an end of the damper and one of the seat and a closed end of the pocket.

3. The cutting tool according to claim 1 comprising a pin, wherein the shank comprises an aperture transversely defined therein for receiving the pin, and the damper comprises a recess transversely defined therein for receiving the pin.

4. The cutting tool according to claim 1, wherein the density of the damper is larger than that of the shank, and the threads are slackly engaged with each other.

5. The cutting tool according to claim 1, wherein the damper comprises:

a core of a density larger than that of the shank; and a shell for receiving the core, with the thread formed on an external side of the shell and slackly engaged with the thread of the shank.

6. The cutting tool according to claim 5, wherein the damper comprises a cover secured to the shell for retaining the core within the shell.

7. The cutting tool according to claim 1, wherein the gap between the threads is 0.01 to 0.5 mm.

\* \* \* \* \*